United States Patent
Marchand et al.

(10) Patent No.: US 12,299,492 B2
(45) Date of Patent: May 13, 2025

(54) METHOD FOR MANAGING THE EXECUTION OF APPLICATIONS STORED IN A TERMINAL

(71) Applicant: Orange, Issy-les-Moulineaux (FR)

(72) Inventors: Hervé Marchand, Chatillon (FR); Olivier Gaste, Chatillon (FR); Mathieu Rivoalen, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 542 days.

(21) Appl. No.: 17/552,977

(22) Filed: Dec. 16, 2021

(65) Prior Publication Data
US 2022/0197705 A1 Jun. 23, 2022

(30) Foreign Application Priority Data
Dec. 17, 2020 (FR) ...................... 2013491

(51) Int. Cl.
*G06F 9/50* (2006.01)
*G06F 9/48* (2006.01)
*G06F 1/329* (2019.01)

(52) U.S. Cl.
CPC .......... *G06F 9/5038* (2013.01); *G06F 9/4881* (2013.01); *G06F 9/5066* (2013.01); *G06F 9/5077* (2013.01); *G06F 1/329* (2013.01); *G06F 9/4893* (2013.01); *Y02D 10/00* (2018.01)

(58) Field of Classification Search
None
See application file for complete search history.

(56) References Cited

U.S. PATENT DOCUMENTS

| 7,257,812 B1* | 8/2007 | Calder | G06F 9/485 718/100 |
| 2002/0184372 A1* | 12/2002 | Ishikawa | G06F 9/445 709/227 |
| 2006/0095916 A1* | 5/2006 | Nishida | G06F 9/485 718/100 |
| 2011/0208953 A1* | 8/2011 | Solomon | B60L 53/65 713/400 |
| 2012/0185776 A1 | 7/2012 | Kirshenbaum et al. | |

(Continued)

FOREIGN PATENT DOCUMENTS

EP 2957984 A1 12/2015

OTHER PUBLICATIONS

French Search Report and Written Opinion dated Aug. 23, 2021 for corresponding French Application No. 2013491, filed Dec. 17, 2020.

*Primary Examiner* — Abu Zar Ghaffari
(74) *Attorney, Agent, or Firm* — David D. Brush; Westman, Champlin & Koehler, P.A.

(57) ABSTRACT

A management method performed by a management entity of a terminal. The method includes starting up the terminal, referred to as a current startup. The terminal includes a plurality of applications stored in the terminal and programmed to be executed after or in parallel with startup of the terminal. The management entity manages execution of the plurality of applications stored in the terminal, by spreading execution of the applications over time. In response to a duration between a start of the current startup and a start of a previous startup being less than a given duration, the management entity increases duration between the execution times of the plurality of applications for a next startup.

10 Claims, 2 Drawing Sheets

(56) References Cited

U.S. PATENT DOCUMENTS

| | | | |
|---|---|---|---|
| 2013/0007865 A1* | 1/2013 | Krishnamurthy | H04L 63/08 726/7 |
| 2013/0298132 A1* | 11/2013 | Kurihara | G06F 9/4843 718/102 |
| 2015/0309751 A1 | 10/2015 | Ellis et al. | |
| 2019/0056957 A1* | 2/2019 | Mewar | G06F 9/442 |
| 2019/0384682 A1* | 12/2019 | Kondo | G06F 9/45558 |
| 2020/0195010 A1* | 6/2020 | Shen | H02J 3/32 |
| 2020/0341805 A1* | 10/2020 | Kim | G06F 9/4881 |
| 2021/0049019 A1* | 2/2021 | Agarwal | G06N 20/00 |
| 2021/0173697 A1* | 6/2021 | Su | G06F 9/485 |

* cited by examiner

[Fig 1]
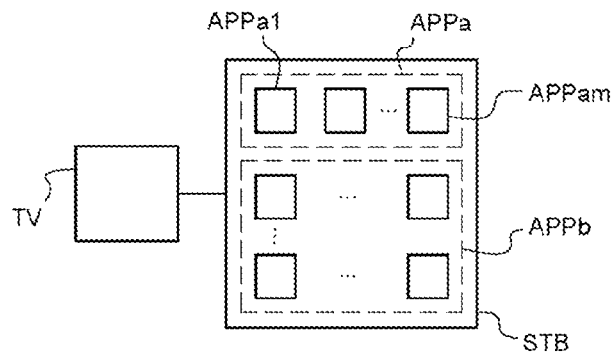
[Fig 2]
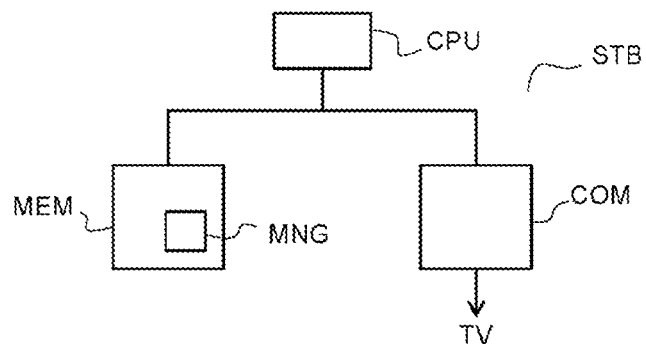
[Fig 3]
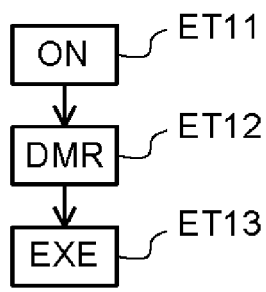

[Fig 4]
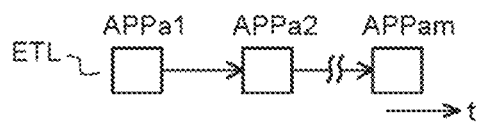
[Fig 5]
[Fig 6]
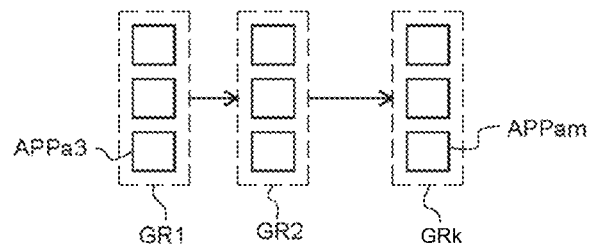
[Fig 7]
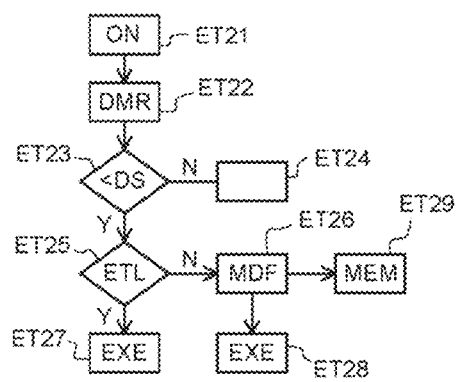

METHOD FOR MANAGING THE EXECUTION OF APPLICATIONS STORED IN A TERMINAL

CROSS-REFERENCE TO RELATED APPLICATIONS

This Application claims priority to and the benefit of French Patent Application FR2013496, filed Dec. 17, 2020, the content of which is incorporated herein by reference in its entirety.

TECHNICAL FIELD

The invention relates to a method for managing the execution of applications stored in a terminal. The invention more specifically targets managing the execution of such applications following startup of the terminal.

The terminal targeted here includes any data processing device able to execute applications. The terminal is for example a digital television set top box, a mobile telephone, a tablet, etc. The illustration of the invention given in the detailed description will be based on a set top box.

The applications targeted here are computer programs that, when they are executed, offer one or more particular services. An application is for example an application dedicated to the playback of multimedia content, such as the application known by the name "Deezer" (registered trademark), or the application known by the name "YouTube" (registered trademark) or any other similar application.

PRIOR ART

A terminal usually comprises multiple applications, the execution of which leads to the consumption of electricity. Among the applications stored on the terminal, some of them are executed in parallel, more often than not as background tasks, following startup of the terminal. Execution as a background task has the main advantage of making an application accessible more quickly when a user requests it; indeed, when the user selects an application executed as a background task, said application, having already been executed, is ready to be used virtually without a delay.

When multiple applications are executed at startup, more often than not in parallel, the respective consumptions add up and form a consumption peak that may be greater than the instantaneous power delivered by the terminal. For example, if the terminal is supplied with power via a (5 V/1 A) USB connection able to supply a power of five watts (5 watts); in this case, the sum of the electric powers consumed by all of the applications must not exceed five watts (5 watts). However, it is observed nowadays that certain applications consume a power of the order of one watt (1 watt) when they are executed. The number of applications able to be executed as a background task therefore cannot exceed five applications in theory. Beyond an instantaneous consumption of five watts, the terminal is not able to supply enough electric power. This insufficiency results in a restart (or reboot) of the terminal, or even a repetition of restarts. The user wishing to use an application experiences the terminal restarting one or more times. The user experience is dreadful.

An embodiment of the invention aims to improve the situation.

SUMMARY

To this end, an exemplary embodiment of the invention relates to a method for managing the execution of applications in a terminal storing a plurality of applications programmed to be executed upon startup of the terminal, characterized in that it comprises, following startup of the terminal, spreading the executions of the applications over time.

According to an embodiment of the invention, applications programmed to be executed immediately after startup will be executed at separate times that are spread over time. Spreading the executions of the applications over time makes it possible to smooth the electricity consumption linked to the execution of the applications over time. An embodiment of invention thus avoids a series of unwanted restarts linked to insufficient instantaneous power of the terminal.

According to a first particular mode of implementation of the invention, the spreading over time is implemented when the terminal restarts at least once in a row with a duration between consecutive startups that is less than a given duration. This first mode is expedient since it promotes speed of access to the applications by implementing the spreading only if this is useful. Indeed, if the execution of multiple applications, immediately after startup, does not lead to the instantaneous power of the terminal being exceeded, the spreading in this case has no benefit and may even be detrimental in terms of speed of access. By contrast, if the duration between two consecutive startups is less than a given duration, this is probably due to an inability to supply enough power to execute all of the applications at a given time; in this case, an embodiment of the invention improves the situation by avoiding unwanted restarts.

According to a second particular mode of implementation of the invention, which may be implemented as an alternative or in addition to the previous one, when the terminal restarts and the duration between this startup and the previous startup is less than a given duration, the duration between the execution times of the applications is increased. This second mode ensures that the configuration parameters of the spreading change over time after each unwanted startup so as to arrive at a startup that ends favorably. The resultant parameters of the modification are stored in read-only memory so as to be reused at the next startup of the terminal.

According to one variant of the first and the second mode, the duration between the execution times of the applications is increased only if the duration between two startups is less than a given duration several times in a row. This variant avoids making a modification to the duration between the execution times of the applications upon each unwanted restart; the electricity consumption of the terminal is thus reduced.

According to a third embodiment of the invention, which may be implemented as an alternative or in addition to the previous ones, the shift comprises a step of detecting the end of execution of an application, the end of the execution triggering the execution of the following application. This third embodiment guarantees that just one application will be executed at a time.

According to a fourth embodiment of the invention, which may be implemented as an alternative or in addition to the previous ones, the time shift comprises prior scheduling of the execution times of the applications. This embodiment is less accurate than the third embodiment but easier to implement, since it avoids detecting the end of execution of an application; all of the times are programmed initially. These execution times are, in the ideal case, chosen such that just one application, or group of applications, is executed at a time.

According to a fifth embodiment of the invention, which may be implemented as an alternative or in addition to the previous ones, the applications are grouped into multiple groups. In this case, the method comprises spreading the execution times of groups of applications. This sixth embodiment makes it possible to execute a few applications at the same time rather than executing them one after another. In this configuration, since the executions of the applications are grouped, the applications are accessible more quickly.

According to a sixth embodiment of the invention, which may be implemented as an alternative or in addition to the previous ones, when the terminal restarts and the duration between this startup and the previous startup is less than a given duration, the number of applications per group is reduced.

According to a seventh embodiment of the invention, the applications involved in spreading are applications running as a background task so as to be used without a delay upon request from a user.

According to one hardware aspect, an embodiment of the invention relates to a management entity for managing the execution of applications stored in a terminal, the applications being programmed to be executed upon startup of the terminal, characterized in that it comprises a temporal spreading module able to spread the execution times of the applications over time.

According to another hardware aspect, an embodiment of the invention relates to a computer program able to be implemented in a management entity such as defined above, said program comprising code instructions that, when the program is executed, perform the step defined in the method defined above.

According to another hardware aspect, an embodiment of the invention relates to a recording medium able to be read by a data processor and on which there is recorded a program comprising program code instructions for executing the steps of the method defined above.

It will be pointed out here that the data medium may be any entity or device capable of storing the program. For example, the medium may comprise a storage means, such as a ROM, for example a CD-ROM or a microelectronic circuit ROM, or else a magnetic recording means, or a hard disk. Moreover, the information medium may be a transmissible medium such as an electrical or optical signal, which may be routed via an electrical or optical cable, by radio or by other means. The program according to an embodiment of the invention may in particular be downloaded from an Internet network. As an alternative, the information medium may be an integrated circuit into which the program is incorporated, the circuit being designed to execute or to be used in the execution of the method in question.

BRIEF DESCRIPTION OF THE DRAWINGS

One or more embodiments of the invention will be better understood on reading the following description, which is given by way of example and with reference to the appended drawings, in which:

FIG. 1 shows a computing system on which one exemplary embodiment of the invention is illustrated.

FIG. 2 is a schematic view of the circuits present in the terminal.

FIG. 3 is a schematic view of the steps implemented according to one possible embodiment of the invention; this embodiment implementing the spreading without any condition.

FIG. 4 is a schematic view of one possible exemplary implementation of spreading over time.

FIG. 5 is a schematic view of another possible exemplary implementation of spreading over time.

FIG. 6 is a schematic view of another possible exemplary implementation of spreading over time applied to groups of applications.

FIG. 7 is a schematic view of the steps implemented according to another possible embodiment of the invention; this embodiment implementing the spreading under a condition.

DETAILED DESCRIPTION OF ONE EXEMPLARY EMBODIMENT ILLUSTRATING THE INVENTION

FIG. 1 shows a data processing device STB on which applications (APP1-APPn) are stored.

The device is for example a set top box STB. The set top box STB is connected to a rendering device rendering device TV in order to render thereon content accessible via software applications stored in the terminal.

The set top box STB and the rendering device TV may form a single device or be connected to one another via a wired (Ethernet, etc.) or non-wired (Wi-Fi, etc.) link.

This FIG. 1 shows applications. In our example, the set top box STB stores two sets of applications APPa (APPa1-APPan) and APPb. The applications in the set APPa are programmed to be executed immediately after startup of the set top box STB, for example in parallel. The applications in the set APPb run upon explicit request from a user, who will select the application and request execution thereof.

The applications in the set APPa are of interest here.

In our example, the applications APPa1-APPan in the set APPa run automatically as a background task in a manner transparent to the user. The advantage of parallel execution immediately after startup is that the applications are available more quickly when a user wishes to use an application. If a user selects one of the applications, for example the application APPa1, said application, having already been executed, will be accessible virtually without a delay.

FIG. 2 shows an architecture of a set top box STB. The set top box STB comprises, as is conventional, memories M associated with a processor CPU. The memories may be ROMs (Read-Only Memory) or RAMs (Random Access Memory) or even flash memories.

The set top box STB furthermore comprises a management entity MNG, stored in memory, the function of which will be explained below.

It will be recalled that, in general, at startup (or booting), a computer executes
  an operating system OS that incorporates a set of programs that manages the use of the capacities of a computing apparatus by application software,
  firmware (FW), which is a software layer developed and integrated within a computing apparatus by manufacturers. This firmware provides a certain number of functionalities. Besides this provision, the main function of firmware is that of implementing communication between the OS and the hardware of the set top box in order to ensure correct operation of said set top box.

We will not go into the details about the execution of the operating system and the firmware as this is of no benefit for the disclosure of the invention. These two executions will be called "startup" hereinafter.

Following startup, or even in parallel with startup, the set top box STB, and by implication the processor CPU, executes applications. For example, the set top box displays a human machine interface HMI for accessing television, VOD, etc. on the screen immediately after startup. Other applications are executed as a background task, that is to say that they are executed but are not displayed on the rendering device TV.

When a user starts up the set top box STB, this user will want to access one of the applications in particular. To reduce the time to display this application, and without knowledge of which application the user will select, multiple applications, for example the ones used most by the user, will be executed following startup.

The executions normally take place in parallel. However, the inventors observed unwanted restarts of the set top box linked to the fact that the set top box STB does not supply enough electric power to execute all of the applications in parallel.

An exemplary embodiment of the invention proposes, following startup of the terminal, to spread the executions of the applications expected to be executed in parallel over time. It will be seen, in one embodiment, that the spreading over time is implemented when the terminal restarts at least once in a row with a duration between consecutive restarts that is less than a given duration.

FIG. 3 illustrates a first embodiment. In this first embodiment, it is considered that the management module MNG spreads the execution of the applications over time immediately after the first startup without any condition. Indeed, it will be seen, in another embodiment, that the management module implements the invention under a condition.

In a first step ET11, the set top box STB is powered on (ON) and starts up.

In a second step ET12, the set top box STB finishes startup DRM.

Following startup, or even during startup, in a third step ET13 (EXE), the management entity MNG spreads the execution of the applications APPa1-APPan over time.

It should be noted here that the principle of an exemplary embodiment of the invention is applicable to one application or to a group of applications. In other words, the spreading may involve applications or groups of applications.

With reference to FIG. 4, the spreading may consist in executing the applications APPa1-APPan in succession or groups of applications in succession, as described below with reference to FIG. 6.

The spreading over time may be implemented in accordance with multiple variants.

According to a first variant, with continuing reference to FIG. 3, the applications APPa1-APPan are ordered and executed one after another, the end of execution of one application APPi, or approximately the end, triggering the execution of the following one APPi+1. A delay period may also be provided between the end of one execution and the start of the following one.

According to a second variant, with reference to FIG. 4, the execution times of the applications may be scheduled at separate times. For example, the applications APPa1-APPan, or groups of applications, are executed every "N" seconds. Unlike the first variant, this second variant does not take into account the effective duration of execution of an application. The schedule may be modified over time, as will be explained below; a modification will be applied for example if the current configuration of the spreading is insufficient due to an excessively low instantaneous electric power of the set top box STB.

According to a second embodiment, described with reference to FIG. 7, the method of the invention is implemented under a condition. The condition is that the terminal restarts at least once in a row with a duration between consecutive startups that is less than a given duration. In our example, the condition is that the duration between two consecutive startups is less than a threshold duration. Indeed, this case arises when the set top box STB does not supply enough power to execute the applications APPa1-APPan in parallel; the set top box STB restarts once or even several times for as long as it is not able to supply enough electricity. These unwanted restarts are able to be recognized through a relatively short duration between each restart of the order of 3 to 4 seconds. The threshold value targeted above is for example an average calculated over durations between unwanted startups observed in the past. The threshold duration may also be the maximum value of the durations obtained between unwanted startups over a given past time range.

This second embodiment improves the situation.

In this second embodiment, the threshold duration is set for example to 3 minutes.

In a first step ET21, the set top box STB is powered on (ON) and starts up.

In a second step ET22, the set top box STB finishes startup DMR.

Following startup, or even in parallel, the execution of the applications may start.

In this second embodiment, in a third step ET23, the set top box STB verifies, before executing the applications, whether the duration between the start of the current startup and the previous one is less than the threshold duration. This verification may be performed by comparing the dates and times of the execution times of the applications in question.

According to one variant, the management entity MNG verifies whether the duration between two successive startups is less than a given duration several times in a row; for example, the management entity observes that the set top box restarts unsuccessfully for the fourth time.

If it is not, in a following step ET24, the method continues with the configuration parameters used in the previous startup.

If it is, if unwanted restarts occur, in a step ET25, the management entity MNG verifies whether spreading ETL is already configured.

If no spreading was initially provided, the management entity MNG, in a following step ET27 (EXE), implements spreading over time as in the first embodiment.

If spreading over time was provided, in a step ET26 (MDF), the parameters of this spreading are modified so as to improve the situation. For example, if the spreading that is used corresponds to the first variant of the first embodiment, a delay period, or even a modification of the delay period if this was already configured, may be triggered when the execution of an application has ended. This delay period, or the new delay period, adds an additional delay between consecutive execution times. If the spreading that is used corresponds to the second variant of the first embodiment, the schedule is modified. For example, the execution does not take place every "N" seconds, but every "M" seconds (M>N, ">" is the "greater than" symbol used in mathematics).

Following the creation of the spreading, or the modification of the parameters of the spreading over time, as the case may be, the set top box STB implements the spreading in a step ET27(EXE) or ET28(EXE), respectively.

Following step ET26, in our example, the new configuration parameters of the spreading are stored in memory in a step ET29(MEM) so as to be reused at the next startup. The date and time of the last startup are also stored.

In our example, the parameters of the spreading are modified as many times as the set top box STB restarts in a row with a duration between the restarts that is less than the threshold duration targeted above; according to one variant, the parameters of the spreading are not modified upon each restart, but every "n" consecutive restarts.

It should be noted that the time and the date of each startup are stored in memory so as to perform this comparison step. Therefore, upon each modification of the parameters of the spreading over time, following the unwanted restarts, the parameters are stored in the read-only memory so as to be reused thereafter.

Therefore, the dates and times of the startups are stored in the set top box STB. This storage makes it possible to compare the current time with the previous time and to determine whether the restart is linked to a problem with the power delivered by the set top box STB.

The various types of spreading described in the present application are applicable to all of the described embodiments.

As has been seen above, the spreading mainly concerns applications intended to be executed in parallel following startup. These applications are generally applications that are often used by the user of the terminal. An exemplary embodiment of the invention is more beneficial the higher the number of applications to be executed as a background task.

The temporal order of the execution times of the applications that is subject to the spreading over time may also be chosen expediently. For example, the probability of using one application more than another may be taken into account in order to establish an execution order of the applications; the likelier it is that the application will be used, the more it is expedient to execute it as early as possible.

It has also been seen above that the spreading over time concerned spreading the execution of each application. As a variant, with reference to FIG. 6, the spreading may concern groups of applications. For example, if there are ten applications, two groups of five applications may be created. The two groups are then managed one after another, the applications in one and the same group being executed in parallel.

Groups of three applications are illustrated in FIG. 6. A first group GR1 comprises the applications APPa1-APPa3, a second group GR2 comprises the applications APPa4-APPa6, etc. A last group GRk comprises the applications APPan-2-Appan. The spreading consists in executing the applications in the first group GR1 in parallel; then the applications in the second group are executed in parallel, etc.

If the terminal restarts and the duration between the consecutive restarts is less than a given duration, according to one variant, the number of applications per group may be lowered so as to reduce the electricity consumption of the group in question. For example, the number of applications per group may be reduced to two applications rather than three applications.

Finally, an exemplary embodiment of the invention is more specifically applicable to applications running as a background task without being limited to these.

Lastly, it should be pointed out here that, in the present text, the term "module" may correspond equally to a software component or to a hardware component or to a set of software and hardware components, a software component itself corresponding to one or more computer programs or subroutines or, more generally, to any element of a program able to implement a function or a set of functions such as described for the modules in question. In the same way, a hardware component corresponds to any element of a hardware assembly able to implement a function or a set of functions for the module in question (integrated circuit, chip card, memory card, etc.).

Although the present disclosure has been described with reference to one or more examples, workers skilled in the art will recognize that changes may be made in form and detail without departing from the scope of the disclosure and/or the appended claims.

The invention claimed is:

1. A management method comprising:
starting up a terminal, referred to as a current startup, the terminal comprising a management entity and a plurality of applications stored in the terminal and programmed to be executed after or in parallel with startup of the terminal;
managing, by the management entity, execution of the plurality of applications stored in the terminal, by spreading starting times of the applications over time;
in response to a duration between a start of the current startup of the terminal and a start of a previous startup of the terminal being less than a given duration, said management entity increasing duration between the starting times of the plurality of applications for a next startup;
executing the plurality of applications after or in parallel to the next startup using the increased duration between the starting times of the plurality of applications.

2. The management method according to claim 1, wherein the spreading over time is implemented when the terminal restarts at least once in a row with a duration between consecutive startups that is less than the given duration.

3. The management method according to claim 1, wherein the management entity increases the duration after the terminal restarts more than one time and the duration between two successive startups of the terminal is less than the given duration for several of the restarts in a row.

4. The management method according to claim 1, wherein the spreading comprises detecting an end of execution of a first application of the applications stored on the terminal, the end of the execution triggering the execution of a second application of the applications stored on the terminal, which follows the first application.

5. The management method according to claim 1, wherein the spreading is preceded by scheduling the starting times of the applications.

6. The management method according to claim 1, wherein the applications are grouped into multiple groups, and the spreading comprises spreading the starting times of the groups of applications.

7. The management method according to claim 6, wherein, when the terminal restarts and the duration between the current startup and the previous startup is less than the given duration, a number of applications per group is reduced.

8. A management entity for managing execution of a plurality of applications stored in a terminal, the plurality of applications being programmed to be executed after or in parallel with startup of the terminal, wherein the management entity comprises:

a processor; and a non-transitory computer-readable medium comprising instructions stored thereon which when executed by the processor configure the management entity to:

manage execution of the plurality of applications stored in the terminal, by spreading starting times of the applications over time;

in response to a duration between a start of a current startup of the terminal and a start of a previous startup of the terminal being less than a given duration, increase duration between the starting times of the plurality of applications for a next startup of the terminal; and executing the plurality of applications after or in parallel to the next startup using the increased duration between the starting times of the plurality of applications.

9. A terminal which comprises the management entity as defined in claim 8.

10. A non-transitory computer-readable recording medium able to be read by a data processor and on which there is recorded a program comprising program code instructions for executing a management method for managing execution of a plurality of applications stored in a terminal, when the instructions are executed by the data processor, the plurality of applications being programmed to be executed after or in parallel with startup of the terminal, and wherein the management method comprises:

managing execution of the plurality of applications stored in the terminal, by spreading starting times of the applications over time;

in response to a duration between a start of a current startup of the terminal and a start of a previous startup of the terminal being less than a given duration, increasing duration between the starting times of the plurality of applications for a next startup of the terminal; and executing the plurality of applications after or in parallel to the next startup using the increased duration between the starting times of the plurality of applications.

* * * * *